Jan. 9, 1951 — D. A. BRUGGER — 2,537,026
DEVICE FOR FORMING FLEXIBLE PACKING AND CUSHIONING ELEMENTS
Filed Jan. 8, 1948 — 5 Sheets-Sheet 1

INVENTOR
DELWIN A. BRUGGER
by Howard L. Johnson
ATTORNEY

Jan. 9, 1951     D. A. BRUGGER     2,537,026
DEVICE FOR FORMING FLEXIBLE PACKING
AND CUSHIONING ELEMENTS
Filed Jan. 8, 1948     5 Sheets-Sheet 2

INVENTOR
DELWIN A. BRUGGER
by Howard L. Johnson
ATTORNEY

Jan. 9, 1951

D. A. BRUGGER 2,537,026

DEVICE FOR FORMING FLEXIBLE PACKING
AND CUSHIONING ELEMENTS

Filed Jan. 8, 1948

INVENTOR
DELWIN A. BRUGGER
by Howard L. Johnson
ATTORNEY

Jan. 9, 1951     D. A. BRUGGER     2,537,026
DEVICE FOR FORMING FLEXIBLE PACKING
AND CUSHIONING ELEMENTS Filed Jan. 8, 1948     5 Sheets-Sheet 5

INVENTOR
DELWIN A. BRUGGER
by Howard L. Johnson
ATTORNEY

Patented Jan. 9, 1951

2,537,026

UNITED STATES PATENT OFFICE 2,537,026

DEVICE FOR FORMING FLEXIBLE PACKING AND CUSHIONING ELEMENTS

Delwin A. Brugger, Los Angeles, Calif.

Application January 8, 1948, Serial No. 1,196

20 Claims. (Cl. 154—1)

This invention relates to a process and apparatus for producing composite packing and cushioning elements consisting of ribbons of zig-zag-folded material attached by their longitudinal edges to one or more sheets of backing material. One form of such elements are described and claimed in my U. S. Patent 2,271,180. The invention also pertains to improved cushioning elements produced by the present process and apparatus, which elements are characterized by a fringe of parallel, laterally extending tongues disposed along one or both longitudinal edges of such ribbons.

An object of the invention is to provide a method and device by which such composite cushioning elements can be produced in volume by a continuous procedure, starting, for example, with sheets of old newspaper, cellophane, fabric, etc.

Another purpose is the provision of synchronized perforating and cutting means adapted to provide such ribbons having laterally extending, parallel tongues along an edge thereof.

Still another object is to provide a series of cutting or shearing means typified by pairs of oppositely revolving disks aligned with said perforating means so as to precisely cut, medially and longitudinally along bands of cross slits formed in the sheet material by said perforating means, while similar pairs of integrated disks simultaneously slit the moving sheet lengthwise along parallel paths between the band of perforations.

A further feature resides in an arrangement of a pair of cooperating guide arms for each cut ribbon by means of which the ribbon, immediately it is cut and crimped by the present shearing disks, is rotated 90 degrees on its longitudinal axis so as to be placed in upright position for attachment of one or both of its longitudinal edges to a backing sheet.

Still other features include the provision of a chamber defined by moving walls and designed to effect expansion and subsequent intermingled compression of adjacent upright (i. e. rotated) ribbons; also the provision of cooperating means for adhesively attaching the moving ribbons to one or more sheets of backing material.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings, which form part of the present specification.

The several units of my device are here assembled for handling material in a continuous, straight-line flow and for this purpose are shown mounted at successive stations of a horizontally disposed, generally rectangular frame or housing 30 (Figs. 1-2) consisting of upright side (32 and 34) and end (36 and 38) walls forming a structure with open top and bottom and supported from the floor 40 by suitable legs 42 at opposite ends. The successive units of the assembly are suspended between the opposite side walls so as to move the material along the longitudinal channel of the frame 30 in a generally horizontal path.

Figure 7:
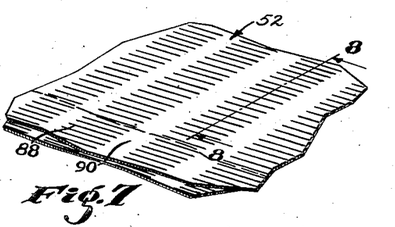
Figure 7 is a perspective view of two overlapping sheets of paper which have passed between the perforating rollers and are accordingly held together by the longitudinal bands of transverse perforations formed jointly in the two sheets.

The first unit of my assembly, designated at A, is designed to form parallel longitudinal bands of transverse scoring or slits, along the length of a sheet of material which is fed therethru. Such a scored or slit sheet of material is shown in Figure 7. At the beginning of the assembly, an endless, horizontally moving, conveyor belt 44 (Fig. 2) is mounted on a pair of rollers 46 and 66 adjacent the mouth 50 of the channel so as to guide into the channel, the sheet material 52 being employed. As here illustrated, the material may be mounted on a large feed roll 54, the axle 56 of which is journalled in a pair of upstanding supporting brackets 58 attached to the opposite side walls, 32 and 34 respectively, the axle being inserted into open-topped vertical slots 60 of each bracket.

In the alternative, separate short sheets of material such as newsprint may be fed into unit A with their ends overlapping for a short distance and they will be there formed into a continuous sheet by the slits made jointly therein, as will be shortly evident. The material supported on belt 44 is then drawn between three smooth rollers 62, 64 and 66, the first two of which are idlers, and are moved by contact with the larger drive roller 66, which serves as well to move the feed belt 44. The function of the pair of idlers 62 and 64 in conjunction with the drive roller 66 is to straighten out any wrinkles or unevenness in the sheet passing between them and to direct it forward therefrom at an angle at which it is adapted to be engaged by and drawn between a pair of oppositely rotating, vertically aligned, intermeshing perforating gears or rollers 68 and 70. The larger feed roller 66 is driven by a belt 71 from the adjacent perforating gear 70. It should be understood that altho, for clarity of illustration, the trio of feed rollers 62, 64, 66 is shown spaced apart from the perforating rollers 68, 70, in practice they are closely adjacent the latter so as to feed the sheet material directly between the perforating rollers, thus preventing the lead edges of successive sheets from missing this intersection of the perforating gears. The same is true in regard to the subsequent feed rollers 92, 94, 96 for unit B.

The gears 68 and 70 have their respective axles 72 and 74 journalled in the opposite side walls 32 and 34. The axle 74 of the lower gear extends beyond the side housing 32 so as to receive upon its outer end a drive belt 76 operated from a suitable source of power such as a motor 78 shown located on the floor 40 therebelow.

Figure 3:
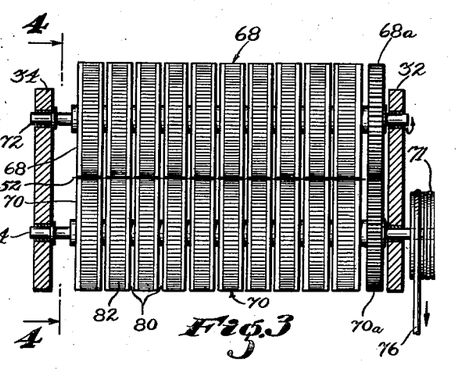
Figure 3 is a transverse, vertical sectional view, partly in elevation, taken thru the the perforating rollers along the line 3—3 of Figure 1.
Figure 4:
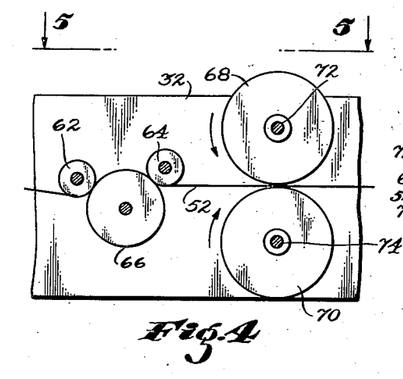
Figure 4 is a side elevational view of the perforating unit, with the nearer side housing removed, as seen along the line 4—4 of Figure 3.
Figure 5:
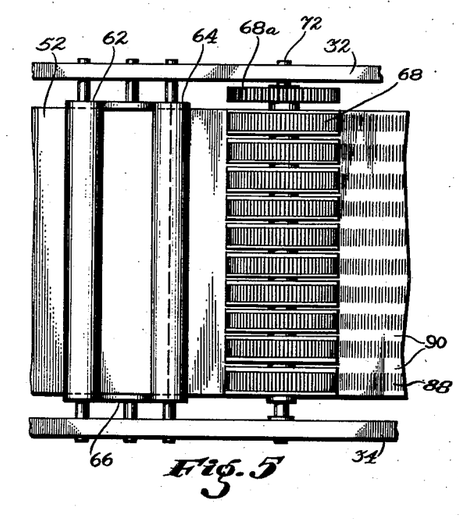
Figure 5 is a top plan view of the perforating unit seen along the line 5—5 of Figure 4.

The upper roller 68 is driven by intermeshing with its lower member 70 and for this purpose there may be provided a pair of separate, end gear members 68a and 70a (Figure 3), between which the sheet of material 52 does not pass, so that their teeth may accordingly be closer fitting.

Figure 6:
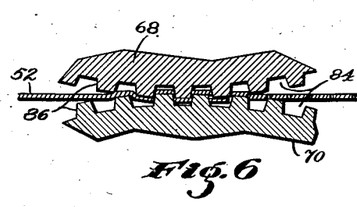
Figure 6 is a longitudinal sectional view taken thru the geared perforating teeth of Figure 3 and particularly showing their engagement with a strip of paper moving between them.

The cylindrical faces of the pair of gears 68 and 70 are provided with a series of circumferential recesses 80, uniformly spaced apart laterally along the length of the gear. (The respective gears 68 and 70 are each shown here as individually formed of a plurality of segments but this is not a functional necessity.) The intermediate, annular bands 82 therebetween are formed with slightly convex, projecting surfaces, having transversely directed, alternate grooves 84 and ridges or teeth 86 (Figure 6) which thus mesh with the opposite member of the opposing gear face. Accordingly, as a sheet of material 52 is drawn between the gear faces, parallel longitudinal bands 88 of transverse slits are formed by the intermeshing of the gear teeth as illustrated in Figures 6 and 7. Along a longitudinal line corresponding to each groove 80 in the gear faces as well as immediately adjacent thereto on both sides thereof for a short distance, the sheet passing between them remains unmarked so as to form continuous strips 90 which hold the adjacent bands of perforations together. It will be noted that the slits or perforations formed in the sheet 52 are caused by the articulation of the side edges of the opposing teeth 86 of the respective gears 68 and 70, and for this purpose as well as to provide clearance for the sheet, the teeth 86 do not extend to the full depth of the opposing recess 84.

By this construction also, it is possible to feed two or more sheets of material thru the gears at the same time and the perforations so formed serve at least temporarily, to unite the two sheets against longitudinal separation, so that when using short sheets, such as newsprint, by merely overlapping their consecutive edges for a short distance, the individual sheets are thus held together to form a continuous strip. If desired, a roll of such strips may be separately formed and stored for later use in subsequent units of the assembly. It will be apparent also, that plain sheets of material may be run thru the subsequent units without perforations. Such plain sheets would produce the cushioning elements described in my U. S. Patent 2,271,180. However, the further advantages obtained by the present perforated sheets is that tongued ribbons rather than plain ribbons are produced therefrom, as will be shortly evident, and these tongued ribbons are subsequently formed into the present improved cushioning elements.

Figure 1:
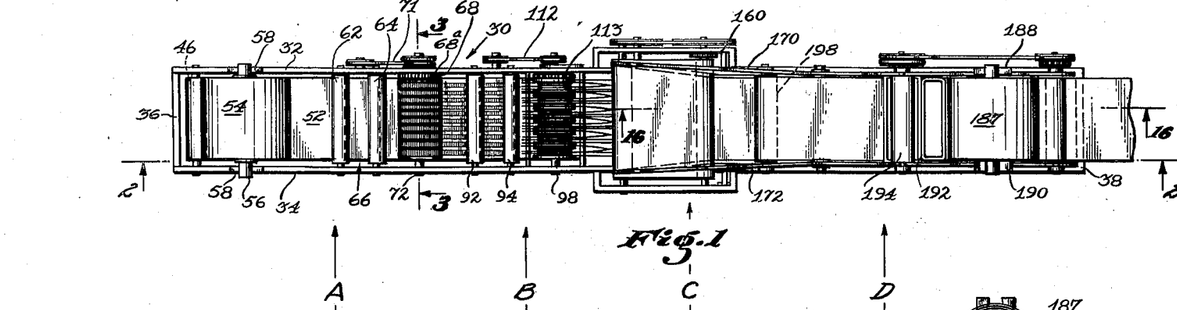
Figure 1 is a top plan view of my device for cutting, rotating, intermingling, compacting and attaching tongued ribbons of sheet material to adhesive sheets of backing material.
Figure 2:
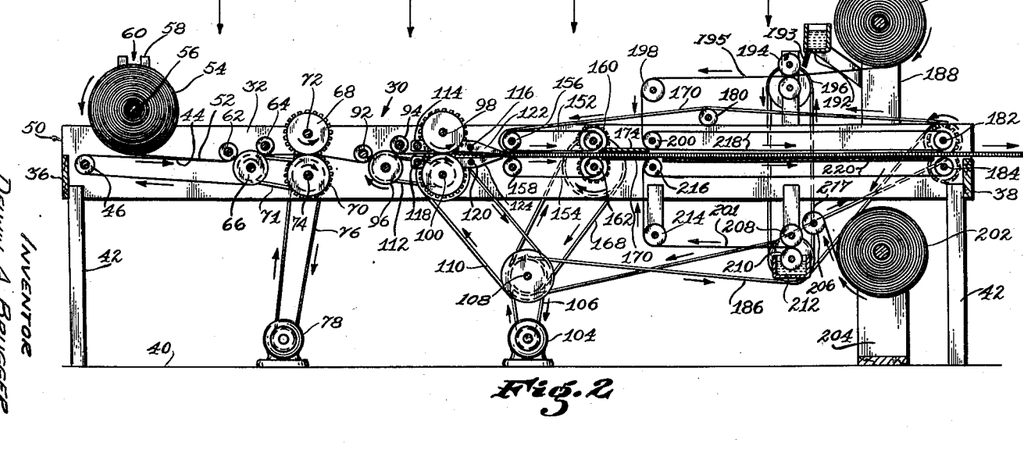
Figure 2 is a vertical longitudinal sectional view taken thru the device along the line 2—2 of Figure 1.

The sheet 52 after it emerges from the pair of perforating rollers 68 and 70, is conveyed into cutting and rotating unit B, being led between a trio of plain, straightening rollers 92, 94 and 96, the first two of which are idlers. The sheet is then directed between a series of opposing pairs of cutting disks mounted respectively on two vertically aligned, rotating shafts 98 and 100, the latter of which is driven by a suitable source of power such as a motor 104 mounted on the floor 40 therebeneath. The motor is connected by a belt 106 to a countershaft 108 from which a second belt 110 is connected to the lower, disk-carrying axle 100, the latter in turn driving the larger feed roller 96 by means of a drive belt 112 (Fig. 1). The upper axle 98 is driven by a gear 113 which meshes with a similar gear on the lower end of the shaft 100 in a manner analogous to gears 68a and 70a of the preceding unit.

Fixedly mounted in the opposite side walls 32 and 34 are four somewhat resilient cross rods 114, 116, 118 and 120 positioned similar to the four corners of a rectangle, two rods being disposed on one side of the cutting disks above and below the sheet of material 52 respectively and the other pair being disposed on the opposite side of the disks in corresponding relationship. The upper and lower pair of rods each have fixedly mounted thereon a transverse series of upright, generally flat, longitudinal guide arms 122 and 124 respectively. The portions of each pair of guide arms between the four mounting rods (that is, in the space immediately adjacent the cutting disks) are disposed in vertical alignment and are vertically spaced apart, while forwardly of this point, beyond the cross rods 116 and 120, the tips of the respective guide arms are curved upward or downward as the case may be so as to approach a common horizontal plane at their ends while at the same time being progressively bent apart laterally. In other words, they diverge laterally while converging vertically.

Figures 10, 11, 12, 13, 14, 15:
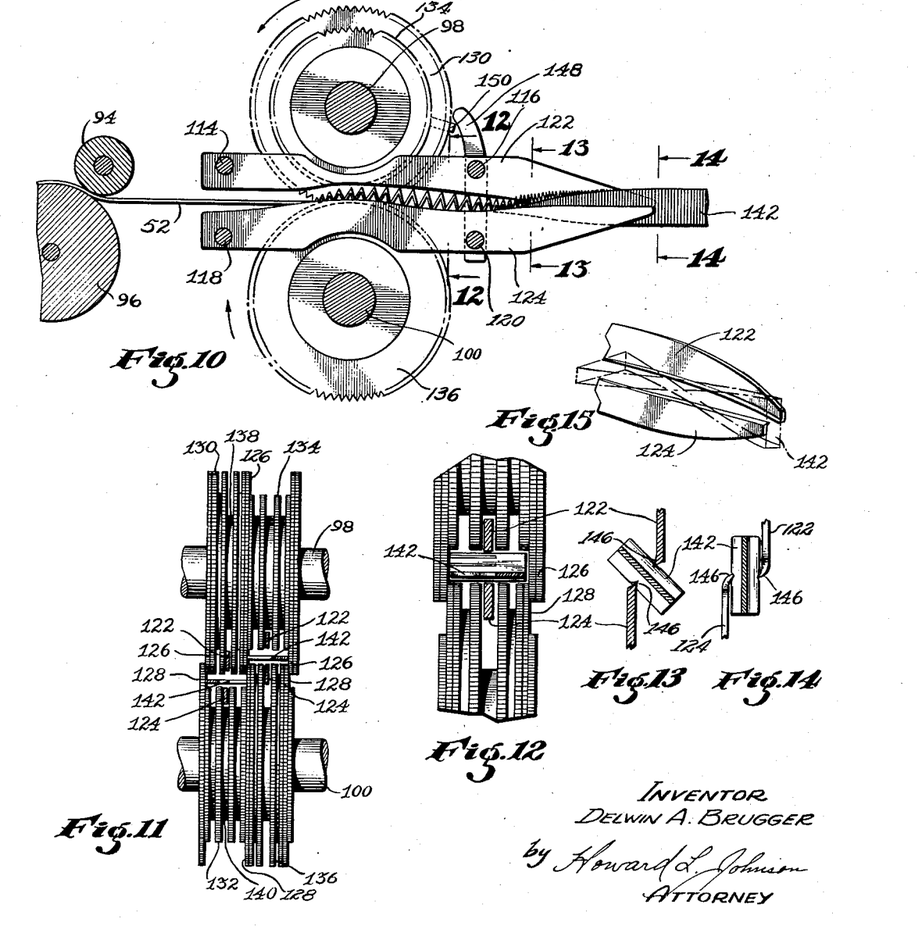
Figure 10 is a vertical longitudinal sectional view, partly in elevation, of the cutting and rotating unit taken along the line 10—10 of Figure 9.
Figure 11 is an elevational view of the cutting disks as seen along the line 11—11 of Figure 9 with the guide arms and ribbons formed therebetween being shown in transverse section taken along a line bisecting the axes of the upper and lower disks.
Figure 12 is a transverse vertical sectional view taken thru a vertical pair of cooperating guide arms along the line 12—12 of Figure 10 with adjacent disks shown in elevation.
Figure 13 is a vertical transverse sectional view thru the pair of guide arms taken along the line 13—13 of Figure 10 and showing particularly the compacted ribbon of sheared material in position of 45° rotation as it passes lengthwise between the engaging guide arms.
Figure 14 is a transverse vertical sectional view of the 90° rotated ribbon taken along the line 14—14 of Figure 10 adjacent the outer terminals of the guide arms which are shown in elevation.
Figure 15 is a perspective view of the ejection end of a pair of guide arms showing the curvature assumed by a ribbon of paper engaged therebetween.
Figure 16:
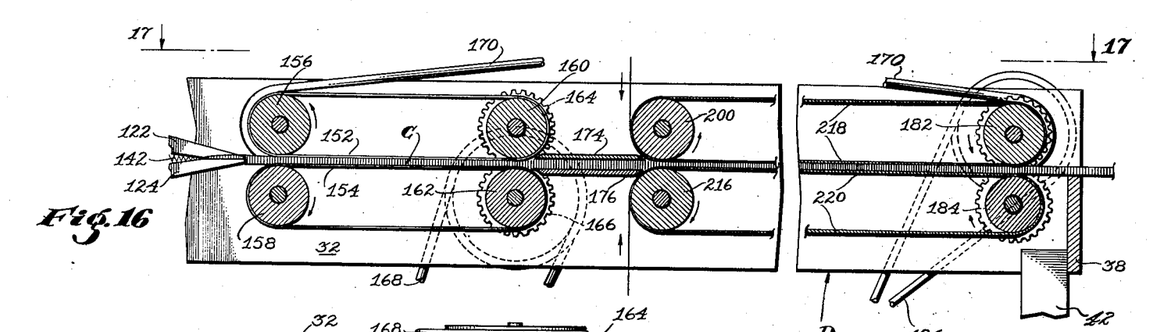
Figure 16 is a longitudinal vertical sectional view taken thru the latter part of the device, showing the expansion chamber which receives the ribbons as they are propelled outward between the guide arms, and also showing the subsequent attachment thereto of adhesive backing sheets as seen along the line 16—16 of Figure 1.

Members of the upper 126 and lower 128 series of shearing disks mounted upon the oppositely rotating axles 98 and 100 are each laterally spaced apart an equal amount and corresponding disks on the two axles overlap in sliding engagement a small amount at the common cutting point therebetween (Fig. 11). Between each transverse pair of cutting disks there is fixedly mounted on the respective shaft, a series of peripherally milled disks, those between laterally adjacent shearing disks being alternately of substantially the same diameter (or slightly greater) as the disks, and of lesser diameter than the disks respectively, while the correspondingly positioned milled disks on the opposite shaft are located in staggered arrangement. Thus, the larger milled disks 130 of the upper shaft are opposite the smaller milled disks 132 of the lower shaft 100 and the adjacent smaller milled disks 134 of the upper shaft are opposite the larger milled disks 136 of the lower shaft.

Pairs of vertically aligned spacing collars 138 and 140 are mounted on the respective shafts 98 and 100 midway between each pair of shearing disks of each shaft in order to allow the projection therealong of the pair of guide arms 122 and 124. The milled disks on either side of each spacing collar up to the adjacent shearing disk may be formed in one piece or may consist of individual disks, which, if desired, can have spacing collars between them also. The purpose of the milled disks is to move or pull forward the ribbons of sheet material sheared by the adjacent cutting disks.

One vertical pair of shearing disks cuts along the center of a longitudinal band 88 of cross perforations, while the next pair of shearing disks cuts midway through the adjacent center strip 90 equidistant between the bands 88 (Fig. 7). The width of each ribbon 142 accordingly equals the lateral separation of successive horizontal pairs of shearing disks and this dimension must, of course, be correlated with the width of the perforating bands 82 upon the preceding perforating gears. As soon as the sheet 52 has passed between the shearing disks, the resultant ribbons 142 are compacted upon themselves in the shape of zigzag, folded rectangular flat portions, due to the back pressure of the packed ribbon ahead, and the midpoints of the upper and lower edges of the ribbon are frictionally engaged between the respective guide arms 122 and 124.

In Fig. 10, the ribbon 142 for greater clarity of illustration is shown as incompletely compacted for some distance after it leaves the cutting disks. However, in practice such is not the case. It will be observed that the ribbon, immediately as it is formed, is situated in a chamber, rectangular in vertical section (Figs. 11–12), the sides of which are formed by the moving sides of the adjacent cutting disks of a common shaft and the top and bottom of which are formed by the edges of opposing milled disks of opposite shafts' (130—132 or 134—136) which series of disks are bisected by the upper and lower guide arms 122 and 124. As soon as the unit B is loaded with ribbons (which is effected by momentarily stopping the expulsion of ribbons from the forward ends of the guide arms), the forward face of this chamber is provided by the compacted ribbon which is slowly moving forward. Since the sheet material is being slit into ribbons much faster than the ribbon itself is moved along, each ribbon is thus forced to move alternately up and down to the opposite walls of this chamber to form the zigzag folds of the compacted ribbon. This occurs as soon as the ribbon is formed so that it will be seen that each pair of guide arms which jointly grasps the compacted ribbon thus forms a forward extension of the compression chamber. At the same time, the tightly compacted ribbons are not retained so long as to destroy their tendency to resume their straightened position when released into the subsequent expansion chamber as hereafter described.

Figure 9:
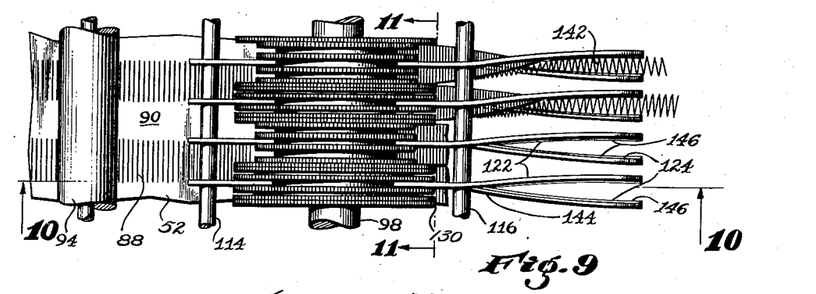
Figure 9 is a top plan view of the cutting and rotating unit comprising the shearing disks and associated guide arms, here shown cutting the sheet of perforated paper and subsequently rotating thru 90° the strips or ribbons thus cut.

At a point 144 (Fig. 9) just beyond the forward cross rods 116 and 120, each guide arm is bent taperingly to one side or the other, and its nearer edge, which moves gradually upward or downward toward a common horizontal plane as previously described, is provided with an inwardly directed scoring edge 146 which is adapted to bite or grasp the compacted ribbon centrally along the length of its side so that the ribbon is held jointly between the opposite, blunt knife edges 146 and accordingly, is constrained to conform to the changing curvature or shape of the edges so that the ribbon is thus progressively rotated from its original horizontal position (Fig. 12), thru an intermediate position (Fig. 13) to a final upright position (Fig. 14) wherein it has been rotated 90 degrees by following the helical path of the knife edges 146.

As previously stated, each pair of guide arms 122 and 124 is located midway between adjacent pairs of cutting disks 126—128 with the guide arms at this point being disposed in vertical alignment with each other and parallel to the cutting disks. In such position, as seen in Fig. 12, they engage the newly formed ribbon 142 on opposite sides along its longitudinal axis. As illustrated in Figs. 13-15, the forward portions of the guide arms are then progressively bent apart so as to rotate the moving ribbon 90 degrees along its longitudinal axis. Alternate pairs of guide arms rotate their ribbons respectively to the right and left so that the upturned ribbons will all have their tongued edges standing in the same direction. In addition, due to the staggered arrangement of the lateral series of vertically opposed milled disks 130—132 and 134—136 between successive pairs of cutting disks, as illustrated in Fig. 11, successive pairs of guide arms 122—124 are correspondingly horizontally staggered so that in order to emit the ribbons 142 at a common level, alternate pairs of guide arms are bent upward or downward as the case may be, in addition to their curvature required to turn the engaged ribbon.

At one end of the shearing assembly, there is mounted a detent arm 148 upon both forward cross rods 116 and 120, the outer end of the arm being disposed to be contacted at each revolution by a projecting pin 150 mounted on an end disk of the upper axle 98. Accordingly, upon each rotation of the axle, the pin causes the detent arm 148 to wobble and bow the cross rods 116 and 120 oppositely in relation to each other, so that, in consequence, the blade edges 146 of the opposite guide arms 122 and 124 are slid reciprocably with respect to each other along the length of the ribbon 142 which is engaged jointly between them. Such action serves to urge onward the engaged ribbon and counteracts to a certain extent the effect of the retarding pressure of the opposite grasping arms upon the compacted ribbon.

Figure 8:
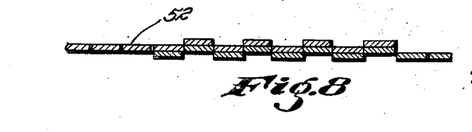
Figure 8 is a longitudinal sectional view thru the overlapping portion of the sheet of Figure 7 taken along a line of subsequent shearing indicated at 8—8 in Figure 7.

The ribbons being ejected from the ends of the several pair of guide arms 122 and 124 are expelled into a moving expansion chamber C formed by a pair of parallel, forwardly moving horizontal belts 152 and 154 vertically spaced apart a distance corresponding to the height of the upright ribbons. The width of the two belts is greater than the transverse extent of the series of cutting disks or corresponding guide arms so that the ribbons ejected into the chamber formed thereby, may spread out laterally and inter- mingle with each other rather than continuing straight in the parallel streams by which they issued from the guide arms. When the ribbons are formed from successive sheets of material joined together by the perforating rollers 68 and 70 as illustrated in Figs. 7-8, the ribbons may now separate at such points of jointure in the expansion chamber C, thus permitting a more intimate intermingling of the ribbons. The endless belts 152 and 154 are mounted at one end on a pair of idler rollers 156 and 158 and at the other end upon a pair of drive rollers 160 and 162, the latter being provided with sprocket gears 164 and 166 upon adjacent ends so that the lower gear or roller 162 being driven from the counter shaft 108 by a drive belt 168, in turn moves the upper roller 160.

Figures 17, 18:
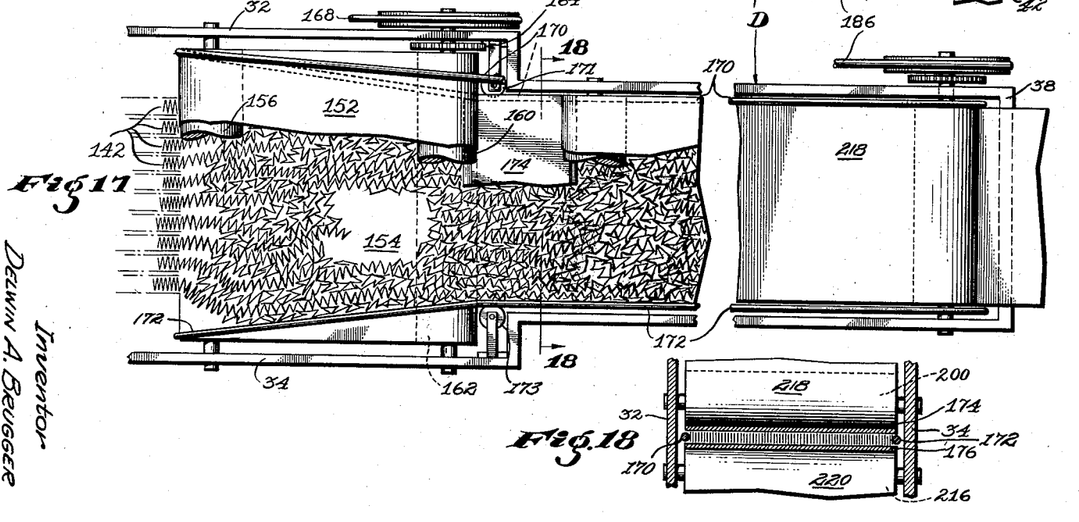
Figure 17 is a top plan view, with portions broken away, of the expansion chamber and backing attachment unit as seen along the line 17—17 of Figure 16.
Figure 18 is a transverse vertical sectional view taken thru the preceding assembly, immediately preceding the rolls which move the adhesive backing against the upright ribbons, as seen along the line 18—18 of Figure 17.
Figure 19:
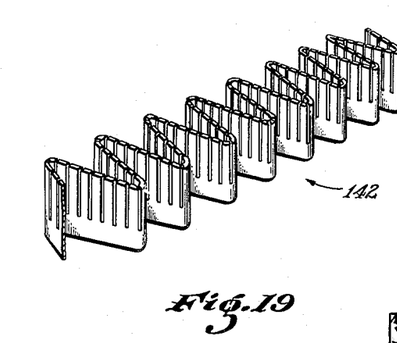
Figure 19 is a perspective view of a ribbon of packing material formed by the present device.
Figure 20:
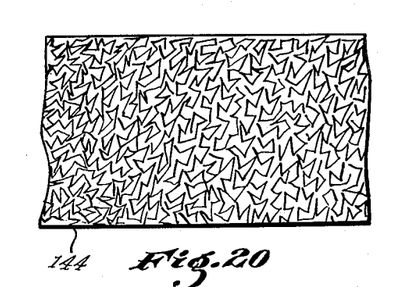
Figure 20 is a top plan view showing the intermingled ribbons attached to a lower backing sheet.
Figure 21:
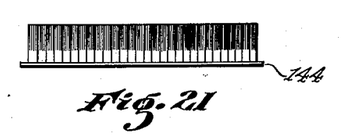
Figure 21 is a side elevational view of a cushioning element formed by the present process wherein tongued ribbons are attached to a backing sheet with their tongues projecting outward.
Figure 22:
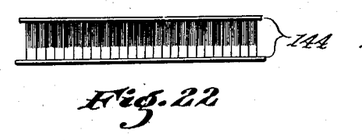
Figure 22 is a side elevational view of a cushioning element formed by two backing sheets attached to opposite ends of the present tongued ribbons.

The side walls of the expansion chamber C are formed by a pair of moving belts 170 and 172 which are directed in a converging path by an opposing, inwardly directed pair of guide rollers 171 and 173, so that as the intermingled ribbons are moved along from the mouth of the chamber toward its terminus (Fig. 17) by the moving top, bottom and side walls, they are at the same time progressively compressed to approximately their original width or even less. The pair of moving side belts 170 and 172 are also led over an intermediate, vertically adjustable, tensioning roller 180 (Fig. 2) and are driven by the upper of a pair of drive rollers 182 and 184 vertically spaced apart at the exit end of the channel and operated by a belt 186 from the countershaft 108. When the intermingled and now compacted ribbons move beyond the rotating belts 152 and 154, they then pass between a pair of horizontal and parallel stationary plates 174 and 176, vertically spaced apart by the approximate height of the ribbons, the latter being continuously conveyed thru this intermediate chamber by the moving side belts from whence they are led by the same belts into the unit D which is designed to apply one or more backing sheets to the ribbons.

Above the unit D, a roll of backing paper 187 (Figs. 1–2) is rotatably journalled in a pair of oppositely disposed, upstanding supporting brackets 188 and 190 while further to the front of the unit there is located an open-topped reservoir of liquid adhesive 192 provided with a dependent wick 193 adapted to drop or wipe adhesive upon the upper face of the unrolling sheet material there below. A pair of vertically aligned rollers 194 and 196 is mounted somewhat below the reservoir, so that the unrolling sheet 195 is drawn between them, the upper roller acting to spread the adhesive more uniformly over the sheet. From here, the backing sheet is led over an upper idler roller 198 from whence it is directed to a second idler roller 200 which presses it against the moving body of ribbons therebeneath.

A similar arrangement is provided below the unit D for attaching a second sheet 201 of backing paper to the opposite or lower face of the moving ribbons, there being a roll of paper or similar material 202 rotatably mounted between a pair of upstanding bracket arms 204, the sheet being led first over a directioning roller 206 and then between a pair of mutually contacting rollers 208 and 210, the latter of which extends into a reservoir 212 of adhesive so as to coat the lower face of sheet material passing therealong. The lower adhesive roller 210 is driven by the belt 186 and, in turn, drives the roller 196 of the upper pair by means of a belt 217. The coated sheet is then directed in turn, over a directing roller 214 and a contacting roller 216, which latter presses it against the lower face of the travelling ribbons.

The ribbons with their attached adhesive sheets are moved along the unit D between a pair of horizontal, endless belts, 218 and 220 respectively, which serve to hold the adjacent backing sheet or sheets against the ribbon until the adhesive has set. These upper and lower belts move along simultaneous with the traveling side belts 170 and 172 since all are driven by the end rollers 182 and 184 between which latter the composite packing and cushioning element finally emerges.

Figure 23:
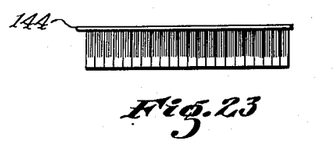
Figure 23 is a side elevational view of a cushioning element formed of a single backing sheet with tongued ribbons attached thereto by their tongued edges.
Figure 24:
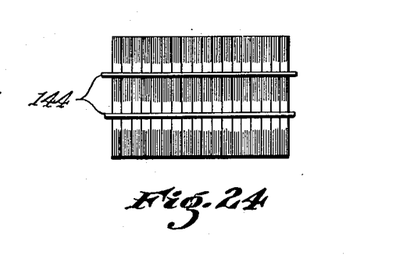
Figure 24 is a side elevational view of a cushioning element comprising a pair of backing sheets sandwiched between three attached layers of tongued ribbons.
Figure 25:
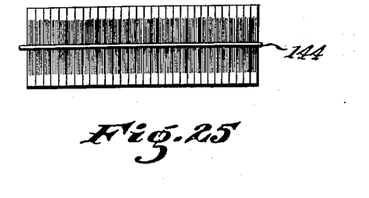
Figure 25 is a side elevational view of a cushioning element formed by attaching tongued ribbons to opposite sides of a single backing sheet by their tongued edges.

As illustrated, particularly in Figs. 21-25, the ribbons 142 may be attached to a single backing sheet 144 by their uncut edge (Fig. 21) or by their tongued edge (Fig. 23). They may be attached between a pair of backing sheets (Fig. 22), which sheets may have other layers of ribbons attached to their outer faces (Fig. 24). A backing sheet may have ribbons attached to both of its sides by their tongued edges (Fig. 25) or by their uncut edges (Fig. 24).

A particular advantage of the packing and cushioning elements produced with the present tongued ribbons is that the uncut length of the ribbon provides resistance to lateral crushing force while the tongued portions provide increased resilience or cushioning effect. Again, the free tongued edge of such a composite element may be disposed against an easily scratched object to afford it protection not obtainable by facing the object either with the uncut edge of a ribbon or with the plain side of a backing sheet of such a composite element.

The present composite elements may be effectively used as a packing wrapper for furniture, bric-a-brac, glass, and chinaware, or, in fact, all fragile articles that are packed for transportation, and also as a protective covering for large heavy articles of furniture having finished surfaces that must necessarily be protected while in storage or transit. They can be used for lining elements placed beneath floor covers, such as carpets, rugs and the like, for producing cushioning effects and minimizing wear on both the carpet or rug and the floor on which it is laid. Where the linings are produced for use beneath floor coverings, they may be treated with suitable chemicals to render them proof against mildew, moth, termites, and other organisms. Again, they may be rendered fire resistant by impregnation with suitable salts. The loose or unattached, crimped, tongued ribbons 142 may also be employed in packing articles, similar to the present use of excelsior.

While I have shown and described in some detail a presently preferred embodiment of my apparatus for continuously producing composite packing and cushioning elements, it is to be understood that various modifications may be made in the fabrication, assembly and use of the device and its products within the spirit and scope of the subsequently claimed invention, which is to be construed broadly.

I claim:

1. A device for preparing packing and cushioning elements from flexible sheet material, comprising in combination: slitting means for forming in said material, longitudinally extending bands of transverse slits, laterally separated by bands of uncut material said slitting means comprising a pair of intermeshing corrugated rollers, which meshing corrugations are longitudinally interrupted so as to leave said bands of uncut material when said sheet is moved therebetween; successive mechanical means for moving the slit material from the corrugated rollers and for dividing said slit sheet into longitudinal ribbons which individually include at least a portion of one of said bands of slits and at least a portion of an adjacent uncut band; retarding means responsive at least in part to the forward movement of the sheet material for crimping said ribbons in a zigzag folded pattern and subsequently positioning said crimped ribbons perpendicular to a common plane; and means for continuously securing a sheet of backing material to at least one edge of said perpendicular ribbons synchronously with the movement of the sheet material thru the device.

2. A device for preparing packing and cushioning elements from flexible sheet material, comprising in combination: slitting means for forming in said material, longitudinally extending bands of transverse slits, laterally separated by bands of uncut material; successive mechanical means for moving the slit material and for dividing said slit sheet along said bands of slits and said uncut bands respectively so as to form longitudinal ribbons individually having a tongued fringe along one edge; retarding means responsive at least in part to the forward movement of the sheet material for crimping said ribbons in a zigzag folded pattern; guide means for rotating adjacent ribbons a quarter turn in opposite directions so as to position said rotated ribbons perpendicular to a common plane with their tongued edges all standing in the same direction; and means for continuously securing a sheet of backing material to at least one edge of said perpendicular ribbons synchronously with the movement of the sheet material thru the device.

3. A device for preparing packing and cushioning elements from flexible sheet material, comprising in combination: slitting means for forming in said material, longitudinally extending bands of transverse slits, laterally separated by bands of uncut material said slitting means comprising a pair of intermeshing corrugated rollers, which meshing corrugations are longitudinally interrupted so as to leave said bands of uncut material when said sheet is moved therebetween; successive mechanical means for moving the slit material from the corrugated rollers and for dividing said slit sheet along said bands of slits and said uncut bands respectively so as to form longitudinal ribbons individually having a tongued fringe along one edge; retarding means responsive at least in part to the forward movement of the sheet material for crimping said ribbons in a zigzag folded pattern; guide means for rotating adjacent ribbons a quarter turn in opposite directions so as to position said rotated ribbons perpendicular to a common plane with their tongued edges all standing in the same direction; means for intermingling said crimped ribbons in a random, non-parallel pattern while simultaneously moving them forward; and means for continuously securing a sheet of backing material to at least one edge of said perpendicular ribbons synchronously with the movement of the sheet material thru the device.

4. A device for preparing packing and cushioning elements from flexible sheet material comprising, in combination: a pair of rotatable members, each member having an axial series of peripheral rings of transverse ridges, each ring of ridges being axially spaced apart from the adjacent rings of the series and the rings of one member being disposed to mesh with the correspondingly spaced rings of the other member whereby a sheet of said material passing between said members is slit by said meshing ridges to form generally parallel, longitudinal bands of transverse slits, which bands are laterally spaced apart along their length; means for dividing said slit sheet into longitudinal ribbons which individually include at least a portion of one of said bands of slits and at least a portion of an adjacent uncut band; means for crimping said ribbons in a zigzag folded pattern and subsequently positioning said crimped ribbons perpendicular to a common plane; and means for securing a sheet of backing material to at least one edge of said perpendicular ribbons.

5. A device for preparing packing and cushioning elements from flexible sheet material comprising, in combination: slitting means for forming in said material, longitudinally extending bands of transverse slits, laterally separated by bands of uncut material; a pair of rotatable, juxtaposed shafts, each shaft fixedly bearing a plurality of cutting disks axially spaced apart, and also fixedly bearing at least one peripherally milled disk located between adjacent cutting disks, the milled disks between adjacent cutting disks of the same shaft being alternately of lesser and substantially equivalent diameter to said cutting disks, the edges of corresponding cutting disks of the two shafts being disposed in shearing registration with each other at a common point so as to divide into longitudinal ribbons a sheet of material passing therebetween, the larger milled disks of one shaft being disposed opposite the smaller milled disks of the other shaft so as to urge forward the ribbons of material formed by said disks, said cutting disks being disposed to divide a sheet of said slit material respectively to intermediate and thru said longitudinal bands of slits; means for crimping said ribbons in a zigzag folded pattern and subsequently positioning said crimped ribbons perpendicular to a common plane; and means for securing a sheet of backing material to at least one edge of said perpendicular ribbons.

6. A device for preparing packing and cushioning elements from flexible sheet material comprising, in combination: slitting means for forming in said material, longitudinally extending bands of tranverse slits, laterally separated by bands of uncut material; a pair of rotatable, juxtaposed shafts, each shaft fixedly bearing a plurality of cutting disks axially spaced apart, the edges of the corresponding cutting disks of the opposite shafts being disposed in shearing registration with each other at a common point so as to divide into longitudinal ribbons a sheet of said slit material, said cutting disks being disposed to divide respectively intermediate and thru said longitudinal bands of slits; and a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the same.

7. A device for preparing packing and cushioning elements from flexible sheet material comprising, in combination: a pair of rotatable juxtaposed shafts, each shaft fixedly bearing a plurality of cutting disks axially spaced apart, the edges of the corresponding cutting disks of the opposite shafts being disposed in shearing registration with each other at a common point so as to divide into longitudinal ribbons, a sheet of material passing therebetween; a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the guide arms; and means for securing a sheet of backing material to at least one edge of said perpendicular ribbons.

8. A device for preparing packing and cushioning elements from flexible sheet material comprising, in combination: a pair of rotatable juxtaposed shafts, each shaft fixedly bearing a plurality of cutting disks axially spaced apart, the edges of the corresponding cutting disks of the opposite shafts being disposed in shearing registration with each other at a common point so as to divide into longitudinal ribbons, a sheet of material passing therebetween; a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the guide arms; means for longitudinally oscillating at least one arm of each pair of opposing guide arms concurrent with rotation of said cutting disks; and means for securing a sheet of backing material to at least one edge of said perpendicular ribbons.

9. In a device for preparing packing and cushioning elements from flexible sheet material, which device includes means for dividing said sheet into elongated ribbons and moving said ribbons longitudinally, the improvement comprising: a forwardly extending pair of guide arms mounted on opposite sides of each of said ribbons, each of said pair of arms being provided with a mutually facing engaging edge bent along a helical path and thus adapted jointly to progressively rotate the same a quarter turn as the ribbon is moved longitudinally therebetween said engaging edges of each pair of guide arms being converged somewhat adjacent their further end so as to retard the longitudinally moving ribbons and force them to form zigzag crimps between the guide arms before being ejected therefrom.

10. A device for preparing packing and cushioning elements from flexible sheet material comprising, in combination: a pair of rotatable members, each member having an axial series of peripheral rings of transverse ridges, each ring of ridges being axially spaced apart from the adjacent rings of the series and the rings of one member being disposed to mesh with the correspondingly spaced rings of the other member whereby a sheet of said material passing between said members is slit by said meshing ridges to form generally parallel, longitudinal bands of transverse slits, which bands are laterally spaced apart along their length; a pair of rotatable, juxtaposed shafts, each shaft fixedly bearing a plurality of cutting disks axially spaced apart, the edges of the corresponding cutting disks of the opposite shafts being disposed in shearing registration with each other at a common point; and said disks being disposed in longitudinal alignment with the rings of said rotatable members so as to divide said slit sheet into longitudinal ribbons which individually include at least a portion of one of said bands of slits and at least a portion of an adjacent uncut band; and operative means for simultaneously turning the successive units of said device so as to move a sheet of said material therethru.

11. A device for preparing packing and cushioning elements from flexible sheet material comprising, in combination: a pair of rotatable, juxtaposed shafts, each shaft fixedly bearing a plurality of cutting disks axially spaced apart, the edges of the corresponding cutting disks of the opposite shafts being disposed in shearing registration with each other at a common point so as to divide into longitudinal ribbons, a sheet of material passing therebetween; a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the same; an expansion chamber comprising at least one pair of opposite, forwardly moving walls, the sides of said chamber extending from an entrance width greater than the composite width of said crimped and parallel standing ribbons adjacent the ends of said guide arms, to an exit width approximating the minimum compacted width of said ribbons; a make-up chamber formed of forwardly moving, parallel, top and bottom walls adapted to press an adhesive backing sheet against at least one edge of said ribbons; and operative means for simultaneously turning the successive units of said device so as to move a sheet of said material therethru.

12. A device for preparing packing and cushioning elements from flexible sheet material comprising, in combination: a pair of rotatable, juxtaposed shafts, each shaft fixedly bearing a plurality of cutting disks axially spaced apart, the edges of the corresponding cutting disks of the opposite shafts being disposed in shearing registration with each other at a common point so as to divide into longitudinal ribbons, a sheet of material passing therebetween; a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the same; cam means for longitudinally oscillating at least one arm of each pair of opposing guide arms concurrent with rotation of said cutting disks; an expansion chamber comprising at least one pair of opposite, forwardly moving walls, the sides of said chamber extending from an entrance width greater than the composite width of said crimped and parallel standing ribbons adjacent the ends of said guide arms, to an exit width approximating the minimum compacted width of said ribbons; a make-up chamber formed of forwardly moving, parallel, top and bottom walls adapted to press an adhesive backing sheet against at least one edge of said ribbons; and operative means for simultaneously turning the successive units of said device so as to move a sheet of said material therethru.

13. A device for preparing packing and cushioning elements from flexible sheet material comprising, in combination: a pair of rotatable, juxtaposed shafts, each shaft fixedly bearing a plurality of cutting disks axially spaced apart, the edges of the corresponding cutting disks of the opposite shaft being disposed in shearing registration with each other at a common point so as to divide into longitudinal ribbons, a sheet of material passing therebetween; a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the same, the guide arms adjacent at least one shaft being mounted on a common, laterally resilient, transverse rod; cam means responsive to rotation of the cutting disks for oscillating said transverse rod whereby the guide arms mounted thereon are reciprocated; an expansion chamber comprising at least one pair of opposite, forwardly moving walls, the sides of said chamber extending from an entrance width greater than the composite width of said crimped and parallel standing ribbons adjacent the ends of said guide arms, to an exit width approximating the minimum compacted width of said ribbons; a make-up chamber formed of forwardly moving, parallel, top and bottom walls adapted to press an adhesive backing sheet against at least one edge of said ribbons; and operative means for simultaneously turning the successive units of said device so as to move a sheet of said material therethru.

14. A device for preparing packing and cushioning elements from flexible sheet material comprising, in combination: pair of rotatable, juxtaposed shafts, each shaft fixedly bearing a plurality of cutting disks axially spaced apart, and also fixedly bearing at least one peripherally milled disk located between adjacent cutting disks, the milled disks between adjacent cutting disks of the same shaft being alternately of lesser and substantially equivalent diameter to said cutting disks, the edges of corresponding cutting disks of the two shafts being disposed in shearing registration with each other at a common point so as to divide into longitudinal ribbons, a sheet of material passing therebetween, the larger milled disks of one shaft being disposed opposite the smaller milled disks of the other shaft so as to urge forward the ribbons of material formed by said disks; a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the same; an expansion chamber comprising at least one pair of opposite, forwardly moving walls, the sides of said chamber extending from an entrance width greater than the composite width of said crimped and parallel standing ribbons adjacent the ends of said guide arms, to an exit width approximating the minimum compacted width of said ribbons; a make-up chamber formed of forwardly moving, parallel, top and bottom walls adapted to press an adhesive backing sheet against at least one edge of said ribbons; and operative means for simultaneously turning the successive units of said device so as to move a sheet of said material therethru.

15. A device for preparing packing and cushioning elements from flexible sheet material comprising, in combination: a pair of rotatable members, each member having an axial series of peripheral rings of transverse ridges, each ring of ridges being axially spaced apart from the adjacent rings of the series and the rings of one member being disposed to mesh with the correspondingly spaced rings of the other member whereby a sheet of said material passing between said members is slit by said meshing ridges to form generally parallel, longitudinal bands of transverse slits, which bands are laterally spaced apart along their length; a pair of rotatable, juxtaposed shafts, each shaft fixedly bearing a plurality of cutting disks axially spaced apart, the edges of the corresponding cutting disks of the opposite shafts being disposed in shearing registration with each other at a common point so as to divide into longitudinal ribbons, a sheet of material passing therebetween, said cutting disks being disposed to divide said sheet respectively intermediate and thru said longitudinal bands of slits; a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the same; an expansion chamber comprising at least one pair of opposite, forwardly moving walls, the sides of said chamber extending from an entrance width greater than the composite width of said crimped and parallel standing ribbons adjacent the ends of said guide arms, to an exit width approximating the minimum compacted width of said ribbons; a make-up chamber formed of forwardly moving, parallel, top and bottom walls adapted to press an adhesive backing sheet against at least one edge of said ribbons; and operative means for simultaneously turning the successive units of said device so as to move a sheet of said material therethru.

16. A device for preparing packing and cushioning elements from flexible sheet material comprising, in combination: a pair of rotatable members, each member having an axial series of peripheral rings of transverse ridges, each ring of ridges being axially spaced apart from the adjacent rings of the series and the rings of one member being disposed to mesh with the correspondingly spaced rings of the other member whereby a sheet of said material passing between said members is slit by said meshing ridges to form generally parallel, longitudinal bands of transverse slits, which bands are laterally spaced apart along their length; a pair of rotatable, juxtaposed shafts, each shaft fixedly bearing a plurality of cutting disks axially spaced apart, and also fixedly bearing at least one peripherally milled disk located between adjacent cutting disks, the milled disks between adjacent cutting disks of the same shaft being alternately of lesser and substantially equivalent diameter to said cutting disks, the edges of corresponding cutting disks of the two shafts being disposed in shearing registration with each other at a common point so as to divide into longitudinal ribbons, a sheet of material passing therebetween, the larger milled disks of one shaft being disposed opposite the smaller milled disks of the other shaft so as to urge forward the ribbons of material formed by said disks, said cutting disks being disposed to divide said sheet respectively intermediate and thru said longitudinal bands of slits; a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the same; an expansion chamber comprising at least one pair of opposite, forwardly moving walls, the sides of said chamber extending from an entrance width greater than the composite width of said crimped and parallel standing ribbons adjacent the ends of said guide arms to an exit width approximating the minimum compacted width of said ribbons; a make-up chamber formed of forwardly moving, parallel, top and bottom walls adapted to press an adhesive backing sheet against at least one edge of said ribbons; and operative means for simultaneously turning the successive units of said device so as to move a sheet of said material therethru.

17. A device for preparing packing and cushioning elements from flexible sheet material comprising, in combination: a pair of rotatable members, each member having an axial series of peripheral rings of transverse ridges, each ring of ridges being axially spaced apart from the adjacent rings of the series and the rings of one member being disposed to mesh with the correspondingly spaced rings of the other member whereby a sheet of said material passing between said members is slit by said meshing ridges to form generally parallel, longitudinal bands of transverse slits, which bands are laterally spaced apart along their length; a pair of rotatable, juxtaposed shafts, each shaft fixedly bearing a plurality of cutting disks axially spaced apart, and also fixedly bearing at least one peripherally milled disk located between adjacent cutting disks, the milled disks between adjacent cutting disks of the same shaft being alternately of lesser and substantially equivalent diameter to said cutting disks, the edges of corresponding cutting disks of the two shafts being disposed in shearing registration with each other at a common point so as to divide into longitudinal ribbons a sheet of material passing therebetween, the larger milled disks of one shaft being disposed opposite the smaller milled disks of the other shaft so as to urge forward the ribbons of material formed by said disks, said cutting disks being disposed to divide a sheet of said slit material, said cutting disks being disposed to divide said sheet respectively intermediate and thru said longitudinal bands of slits; a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the same, the guide arms adjacent each shaft being mounted on a common, laterally resilient transverse rod; cam means responsive to rotation of the cutting disks for oscillating one of said transverse rods whereby the guide arms mounted thereon are oppositely reciprocated; an expansion chamber comprising at least one pair of opposite, forwardly moving, walls, the sides of said chamber extending from an entrance width greater than the composite width of said crimped and parallel standing ribbons adjacent the ends of said guide arms, to an exit width approximating the minimum compacted width of said ribbons; a make-up chamber formed of forwardly moving, parallel, top and bottom walls adapted to press an adhesive backing sheet against at least one edge of said ribbons; and operative means for simultaneously turning the successive units of said device so as to move a sheet of said material therethru.

18. In a device for preparing packing and cushioning elements from flexible sheet material, which device includes means for dividing said sheet into elongated ribbons and moving said ribbons longitudinally, the improvement comprising: a forwardly extending pair of guide arms mounted on opposite sides of each of said ribbons, each of said pair of arms being provided with a mutually facing engaging edge bent along a helical path and thus adapted jointly to progressively rotate the same a quarter turn as the ribbon is moved longitudinally therebetween, said engaging edges of each pair of guide arms being converged somewhat adjacent their further end so as to retard the longitudinally moving ribbons and force them to form zigzag crimps between the guide arms before being ejected therefrom; and means for longitudinally oscillating at least one of the pair of guide arms synchronously with the forward movement of the sheet material.

19. In a device for preparing packing and cushioning elements from flexible sheet material, which device includes means for dividing said sheet into elongated ribbons and moving said ribbons longitudinally, the improvement comprising: a pair of rotatable, juxtaposed shafts, each shaft fixedly bearing a plurality of cutting disks axially spaced apart, and also fixedly bearing at least one peripherally milled disk located between adjacent cutting disks, the milled disks between adjacent cutting disks of the same shaft being alternately of lesser and substantially equivalent diameter to said cutting disks, the edges of corresponding cutting disks of the two shafts being disposed in shearing registration with each other at a common point so as to divide into longitudinal ribbons, a sheet of material passing therebetween, the larger milled disks of one shaft being disposed opposite the smaller milled disks of the other shaft so as to urge forward the ribbons of material formed by said disks; and a forwardly extending guide arm centrally mounted between each lateral pair of cutting disks of each shaft, the engaging edges of each opposing pair of said arms being disposed substantially perpendicular to the cutting plane defined by adjacent pairs of disks, and thence being bent apart progressively along a helical path for a quarter turn, said engaging edges being thus adapted jointly to grasp the adjacent, newly formed ribbon and successively crimp and rotate the same 90° as it moves longitudinally between the same, said engaging edges of each pair of guide arms being converged somewhat adjacent their further end so as to retard the longitudinally moving ribbons and force them to form zigzag crimps between the guide arms before being ejected therefrom.

20. In a device for preparing packing and cushioning elements from flexible sheet material, which device includes means for dividing said sheet into elongated ribbons and moving said ribbons longitudinally, the improvement comprising: a pair of rotatable, juxtaposed shafts, each shaft fixedly bearing a plurality of cutting disks axially spaced apart, and also fixedly bearing at least one peripherally milled disk located between adjacent cutting disks, the milled disks between adjacent cutting disks of the same shaft being alternately of lesser and substantially equivalent diameter to said cutting disks, the edges of corresponding cutting disks of the two shafts being disposed in shearing registration with each other at a common point so as to divide into longitudinal ribbons, a sheet of material passing therebetween, the larger milled disks of one shaft being disposed opposite the smaller milled disks of the other shaft so as to urge forward the ribbons of material formed by said disks; and retarding means for crimping the ribbons in a zigzag folded pattern in response to the forward movement of said ribbons by the milled disks thereagainst.

DELWIN A. BRUGGER.

REFERENCES CITED

The following references are of record in the file of this patent:

UNITED STATES PATENTS

| Number | Name | Date |
|---|---|---|
| 1,251,964 | Clark | Jan. 1, 1918 |
| 1,263,987 | Wyman | Apr. 23, 1918 |
| 1,869,531 | Ward | Aug. 2, 1932 |
| 1,924,472 | Thomson | Aug. 29, 1933 |
| 2,020,928 | Asnes | Nov. 12, 1935 |
| 2,028,388 | Gerard et al. | Jan. 21, 1936 |
| 2,091,744 | Walker | Aug. 31, 1937 |
| 2,101,906 | Hopkinson | Dec. 14, 1937 |
| 2,116,048 | Smith | May 3, 1938 |
| 2,271,180 | Brugger | Jan. 27, 1942 |
| 2,373,500 | Pearce | Apr. 10, 1945 |